United States Patent [19]

Ribka et al.

[11] 4,048,152
[45] Sept. 13, 1977

[54] MODIFIED FORM OF DISAZO PIGMENT CI 20040

[75] Inventors: Joachim Ribka, Offenbach am Main; Wolfgang Rieper, Frankfurt am Main; Siegfried Schwerin, Hofheim, Taunus, all of Germany

[73] Assignee: Hoechst Aktiengesellschaft, Frankfurt am Main, Germany

[21] Appl. No.: 631,122

[22] Filed: Nov. 11, 1975

Related U.S. Application Data

[63] Continuation of Ser. No. 434,037, Jan. 17, 1974, abandoned.

[30] Foreign Application Priority Data

Jan. 19, 1973 Germany .......................... 2302481

[51] Int. Cl.² .......................................... C09B 43/00
[52] U.S. Cl. ................................ 260/176; 260/208; 106/288 Q
[58] Field of Search ....................... 260/176, 208; 106/288 Q

[56] References Cited

U.S. PATENT DOCUMENTS

| 3,711,461 | 1/1973  | Pretzer et al. ........... 260/208 X |
| 3,872,078 | 3/1975  | Cseh et al. ............... 260/176   |
| 3,910,875 | 10/1975 | Rieper et al. ........... 260/208 X  |
| 3,928,315 | 12/1975 | Ribka ....................... 260/208   |

FOREIGN PATENT DOCUMENTS 1,179,908  10/1964  Germany .......................... 260/208

OTHER PUBLICATIONS

*Colour Index*, 3rd Ed., vol. 4, p. 4140, CI No. 20040.

Primary Examiner—Charles F. Warren
Attorney, Agent, or Firm—Curtis, Morris & Safford

[57] ABSTRACT

A form of the disazo pigment C.I. 20040 having the formula

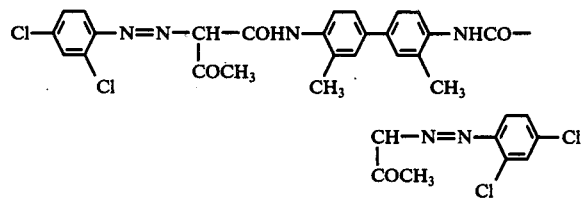

is shown having improved covering power, improved fluidity in lacquer systems and high luster, which is characterized by a specific surface of 10 - 20, preferably 12 - 17 m²/g and a maximum in grain diameter distribution between 500 and 1000 nm, at least 30 % of all grains having a diameter of from 500 to 1000 nm and less than 25% of all grains having a diameter of more than 1000 nm. This new pigment is obtained by isolating the pigment, after coupling, by stirring it out with alkali and, after having filtered it off and washed until neutrality, heating it to temperatures above 100° C with an organic solvent which is immiscible with water or miscible with water to a limited degree only.

1 Claim, No Drawings

MODIFIED FORM OF DISAZO PIGMENT CI 20040

This is a continuation, of application Ser. No. 434,037, filed Jan. 17, 1974 now abondoned The present invention relates to a disazopigment, to a process for preparing it and to its use. The pigment of the formula

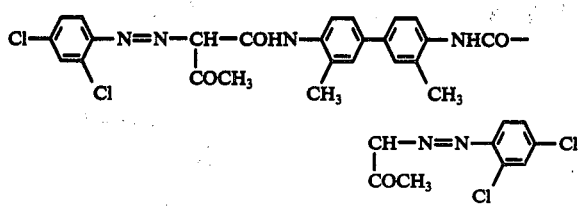

(C.I. Pigment Yellow 16, 20040) obtained by the reaction of 4,4'-bis-(acetoacetylamino)-3,3'-dimethyl -benzidine with 2 equivalents of diazotized 2,4-dichloroaniline is obtained after coupling in a form in which it cannot be used for highly covering full tone lacquerings owing to its high absorption of binder. The high binder absorption which is due to the high proportion of finest grains with strong tendency to agglomeration leads with pigment concentrations of more than 10 % by weight in the lacquer, to highly viscous pastes with low fluidity which can hardly be worked and which yield stove lacquerings without surface luster.

The pigment obtained after coupling has a specific surface of 13 - 25 m$^2$/g; more than 35% of all pigment particles are over 1000 nm in diameter.

Now, we have found a form of the disazopigment C.I. 20040 with high covering power, good fluidity in lacquer systems and has a high luster effect, which is characterized by a specific surface of 10 - 20, preferably 12 - 17, m$^2$/g; and a maximum in grain diameter distribution between 500 and 1000 nm, at least 30% of all grains having a diameter of from 500 to 1000 nm and less than 25% of all grains having a diameter of more than 1000 nm.

This new pigment form is obtained by isolating the pigment, after coupling, by stirring it out with alkali and, after having filtered it off and washed it until neutrality, heating it to temperatures above 100° C with an organic solvent which is immiscible with water or miscible with water to a limited degree only. The isolation by stirring with the aid of alkali is effected by rendering alkaline the suspension of pigment such as it is obtained after the usual coupling reaction and stirring it for about 1 hour at an elevated temperature. The pigment is then filtered off and washed until neutral. The wet press cake so obtained or the dry pigment is then suspended in a mixture of water and an organic solvent which is immiscible with water or miscible with water to a limited degree only.

The content of pigment in this suspension is in the range of from about 2 to 10, preferably 5 to 8, % by weight. The proportion of organic solvent in the total quantity of liquid is in the range of between 5 and 100 % by weight.

This suspension is heated for some time to temperatures above 100° C, preferably to temperatues in the range of from 120° C to 180° C. The time of this heat treatment depends on the temperature chosen and on the organic solvent. The higher the temperature and the more solvent is used, the shorter is the time required. In general, the treatment times are between about 10 minutes and 8 hours. The reaction conditions required for obtaining optimum covering power can be determined, for example by preliminary tests on a reduced factorial scale.

As organic solvents which are not miscible with water to an illimited degree, there may be used in particular chlorobenzene and other halogenated aromatic compounds, for example o-dichlorobenzene, but also higher alcohols of 4 to 8 carbon atoms, for example isobutanol, aromatic nitro-compounds such as nitrobenzene, aromatic amines such as aniline, aromatic ethers such as anisole or phenetol, esters of aromatic acids, for example benzoic acid methyl or ethyl ester, and ketones such as methyl-iso-butyl ketone or methyl-iso-propyl ketone. The term "not miscible with water to an illimited degree" refers to those solvents whereof 20 g at maximum are miscible with 100 g of water.

Isolation of the pigment so treated from the aqueous suspension is preferably carried out by filtration, after having distilled off the organic solvent with the aid of steam.

The distribution of the particle size was measured according to the method described by C.E. Marshall in "Proceedings of the Royal Society", London A 126, page 427 (1936). The specific surface was measured according to the method described by R. Haul, G. Dumbgen in Chem. Ing. Tech. Vol. 35, page 586 (1963).

The new pigment form is especially suited for the pigmentation of highly concentrated lacquers for covering full tone lacquerings, for the preparation of covering plastics dyeings and special printing pastes, for example for the printing of sheet metal. Compared with lacquerings produced with the pigment form as it is obtained after coupling, stove lacquerings produced with the pigment form of the invention show, with a pigment concentration of more than 10 % by weight, a distinctly improved luster effect which corresponds to at least twice as high luster values, measured according to the ASTM 523-67 standard. The viscosity of lacquers with high concentration of pigments is greatly improved by the use of the new pigment form.

The following Examples illustrate the invention:

EXAMPLE 1:

The pigment obtained by coupling bis-diazotized 2,4-di-chloroaniline with half an equivalent of 4,4'-bis-(acetoacetyl-amino)-3,3'-dimethyl-benzidine was isolated and washed until free from salt and stirred into water to give a 10% suspension. The suspension was heated to 55° C and 5 % by weight, referred to the quantity of pigment used, of 33 % sodium hydroxide solution was added. After having stirred for half an hour at 50°-55° C, the yellow pigment was separated by filtration and washed with 60° C warm water until neutrality. The product so purified was heated for 6 hours to 150° C in a 6% aqueous suspension which contained 10% by weight, referred to the quantity of pigment, of chlorobenzene and 3 % by weight of oleylaminoacetate. After cooling to 90° C, the chlorobenzene was distilled off with steam and the pigment was filtered off from the remaining aqueous suspension. The dried and ground dyestuff had a specific surface of 12.6 m$^2$/g., 30 % of all pigment particles had an average diameter of between 500 nm and 1000 nm 25 % an average diameter greater than 1000 nm. When 15 % by weight of this pigment was incorporated into an alkyd-melamine resin clear lacquer in a paint shaker, the pigmented lacquer then coated onto test cards over a black and white ground and he cards stoved for 30 minutes at 140° C, lacquerings were obtained which had a very high covering power, faultless flow and good luster. the luster value measured with the luster measuring device Hunterlab D 48 D of Messrs. Hunter Assoc. Lab. Inc. (corresponding to ASTM 523-67 standard) was 18.6 (under a measuring angle of 20°), as compared with a luster value of 7.4 obtained by measurement of a lacquering produced with the pigment as it had been obtained directly after coupling.

EXAMPLE 2

100 g of the approximately 40% dyestuff paste obtained after alkaline pre-purification according to Example 1 were suspended in 300 ml of water and, after addition of 300 ml of isobutanol, heated for 2 hours to 150° C in a closed vessel. After cooling to 80° C, the organic solvent was distilled off with the aid of steam and the pigment was isolated from the remaining aqueous suspension. The dried and ground dyestuff had a specific surface of 14.2 m²/g., 40 % of all pigment particles had an average diameter of between 500 and 1000 nm, 21 % an average diameter which was greater than 1000 nm. Stove lacquerings produced with 15% pigment lacquers showed the same good covering power, good flow and luster as those of the lacquerings described in Example 1.

We claim:
1. A disazo pigment of the formula

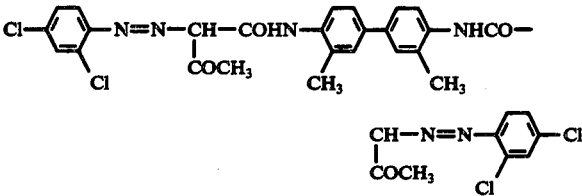

characterized by a specific surface of 10 - 20 m²/g, a maximum of the grain size distribution of between 500 and 1000 nm with a proportion of these grain sizes in the total distribution of at least 30 % and by a proportion of the grain sizes exceeding 1000 nm of no more than 25 % in the total distribution.

* * * * *